Figure 1:
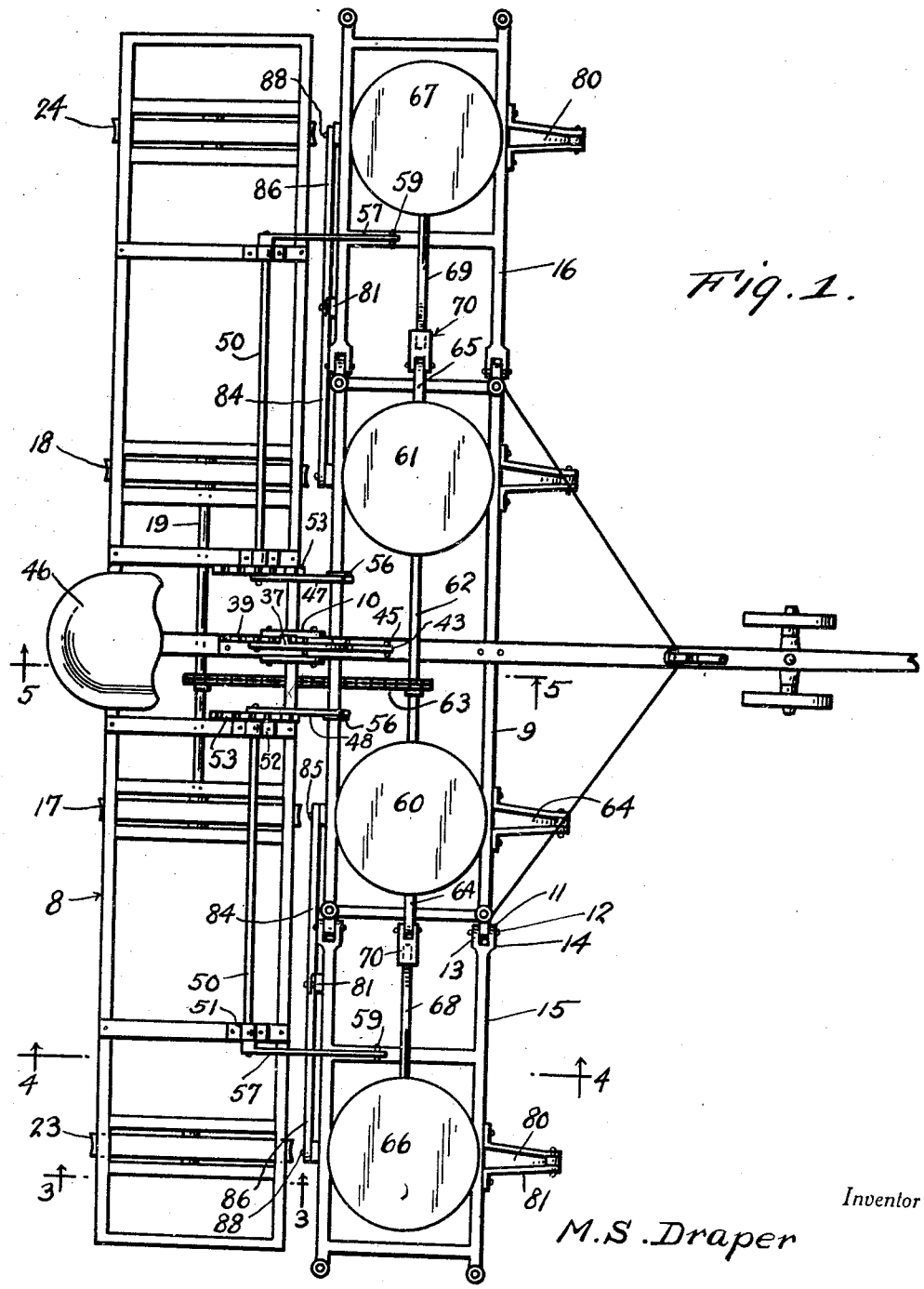

Sept. 1, 1931.   M. S. DRAPER   1,821,009
EXTENSION ATTACHMENT FOR TWO-ROW CORN PLANTERS
Filed April 17, 1930   4 Sheets-Sheet 1

Inventor
M. S. Draper
By Clarence A. O'Brien
Attorney

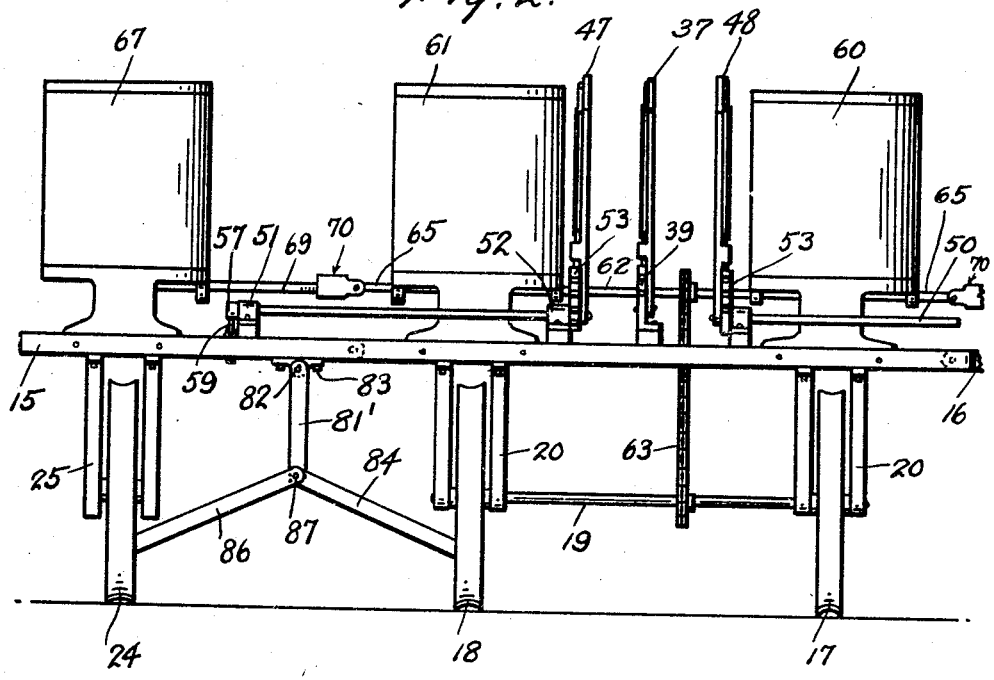
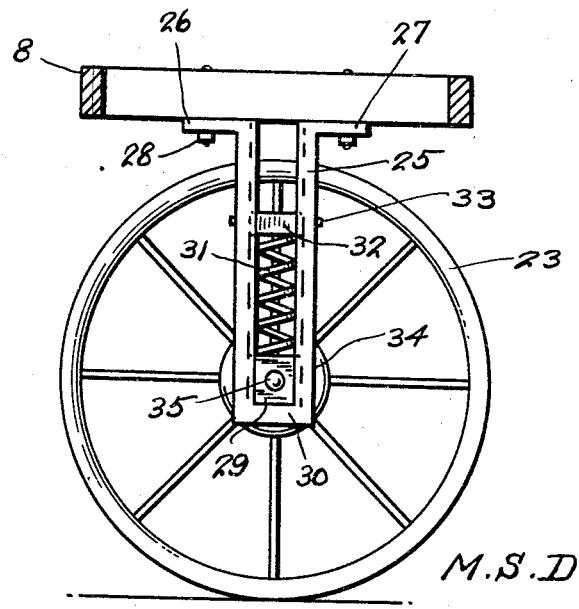

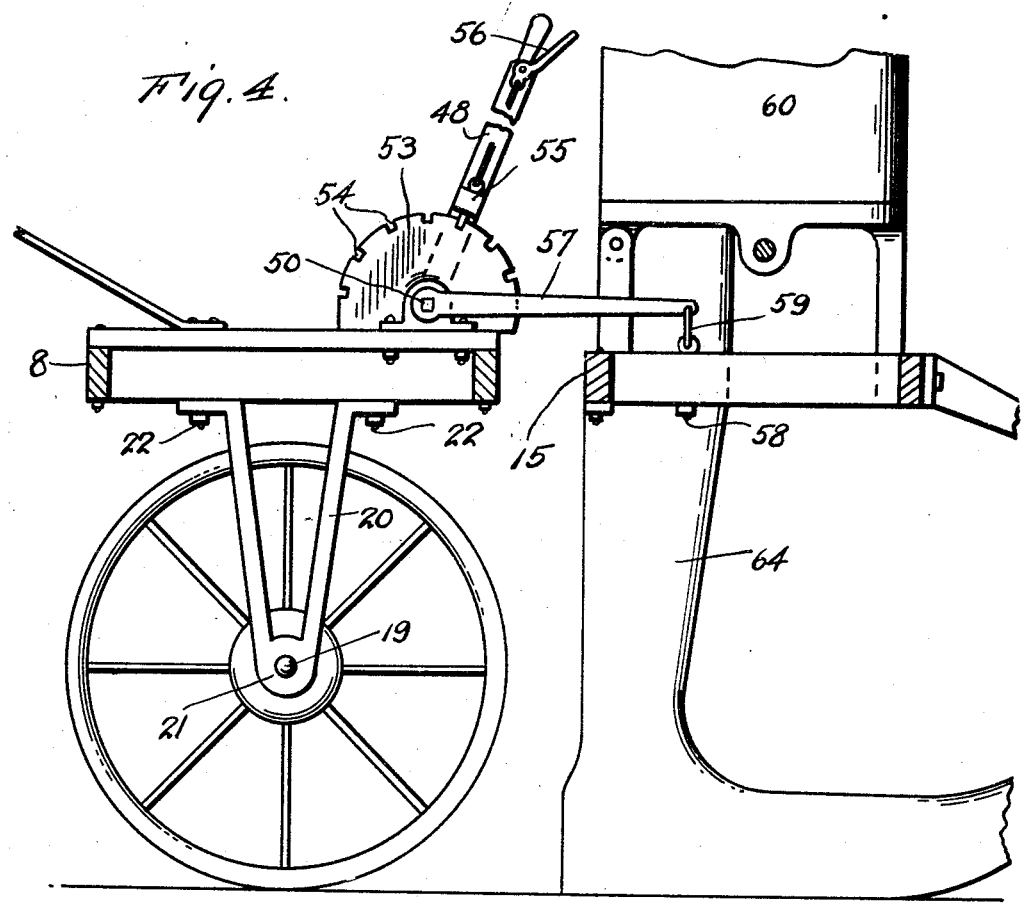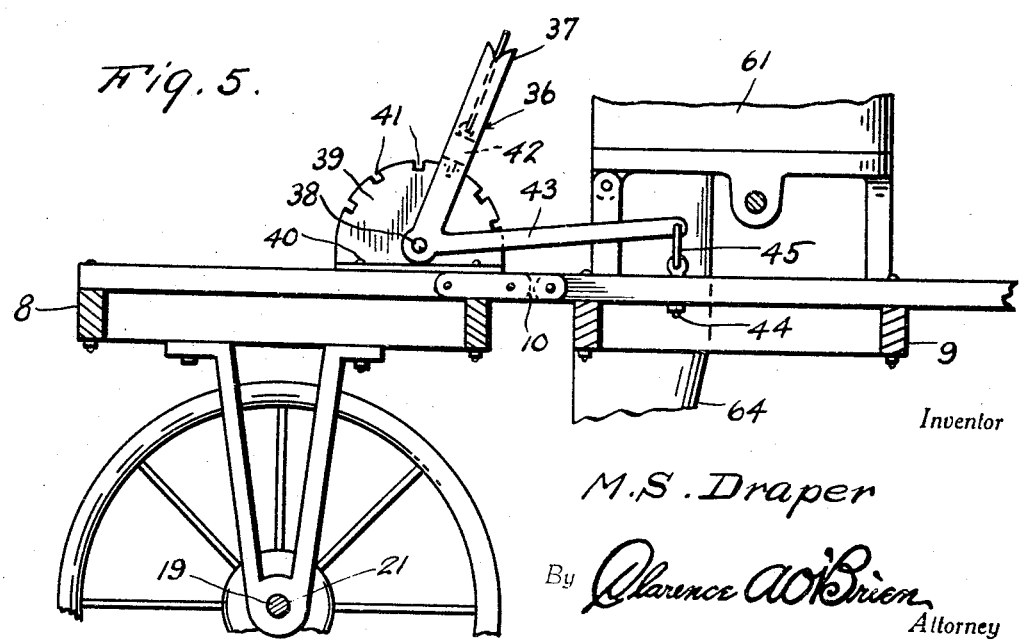

Sept. 1, 1931.  M. S. DRAPER  1,821,009
EXTENSION ATTACHMENT FOR TWO-ROW CORN PLANTERS
Filed April 17, 1930  4 Sheets-Sheet 4
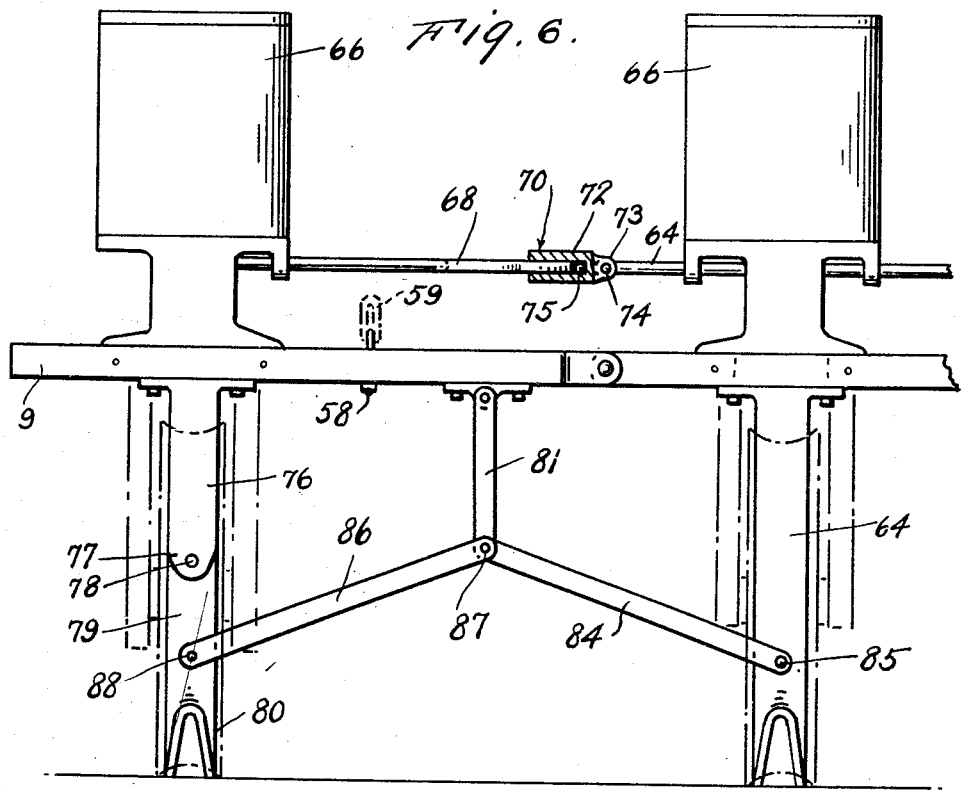
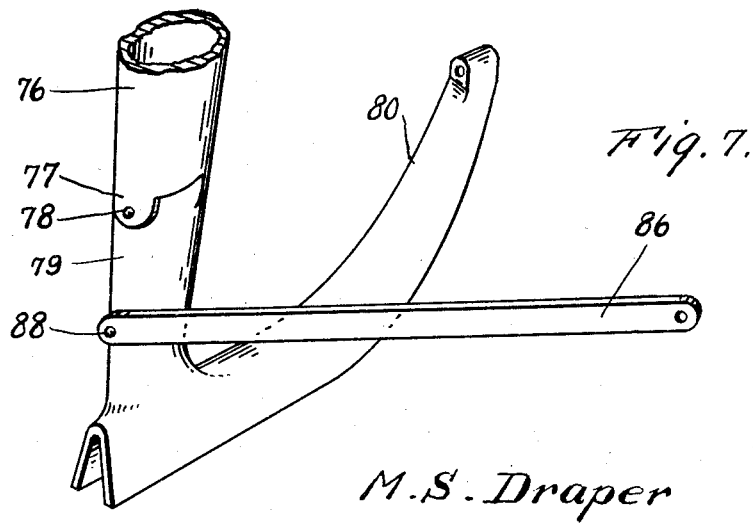
Inventor
*M. S. Draper*
By *Clarence A. O'Brien*
Attorney Patented Sept. 1, 1931

1,821,009

UNITED STATES PATENT OFFICE

MERRITT S. DRAPER, OF UPLAND, INDIANA

EXTENSION ATTACHMENT FOR TWO ROW CORN PLANTERS

Application filed April 17, 1930. Serial No. 445,073.

This invention relates to extension attachments for two row corn planters, and an object of the invention is to provide for adapting the two-row planter to a three or four row planter as desired.

Another feature of the invention is to provide widening the wheel frame and adding retractile ground engaging wheels on the outer ends thereof to permit the wheel frame to move up and down on uneven ground.

Another feature of the invention is to provide swingable lateral extensions on the drill frame, and at the same time to provide for rocking the drill so that the latter will always be in a vertical position with respect to the ground.

Further objects of the invention are to provide an extension of the character referred to that is strong, compact and durable, thoroughly reliable for its intended purpose, very simple in its method of assembly, adaptable for installation on all standard planters, and that is comparatively inexpensive to manufacture and operate.

With the foregoing and other objects in view, the invention consists of a novel construction, combination, and arrangement of parts as will be hereinafter more fully described and illustrated in the accompanying drawings, wherein is disclosed an embodiment of the invention, but it is to be understood that changes, variations, and modifications may be resorted to without departing from the spirit of the claim hereto appended.

In the drawings wherein like reference characters denote corresponding parts throughout the several views:—

Figure 1 is a top plan view of a corn planter modified in accordance with the present invention, Fig. 2 is a fragmentary, enlarged rear elevation thereof, Fig. 3 is a detailed, vertical section through the wheel supporting frame, taken substantially on the line 3—3 of Fig. 1 and looking in the direction of the arrows, Fig. 4 is an enlarged, detailed, vertical section taken substantially on the line 4—4 of Fig. 1 and looking in the direction of the arrows, Fig. 5 is a detailed, vertical section taken substantially on the line 5—5 of Fig. 1 and looking in the direction of the arrows, Fig. 6 is an enlarged, fragmentary front elevation, and Fig. 7 is an enlarged perspective view of one of the drills.

Referring to the drawings wherein for the purpose of illustration is shown the preferred embodiment of the invention, I dispense with the conventional two wheel frame and add the horizontal rectangular frame indicated generally at 8, which is much wider than the original frame. This wheel frame is rigid throughout its entire width.

The conventional two row drill supporting frame is indicated generally at 9, and is located in front of the frame 8 and is disposed in the same horizontal plane as said frame 8. The two frames are connected together at their centers by the links 10, said links being connected to the forward part of the frame 8 and to the rear part of the frame 9. These links permit relative movements of the two frames.

The pivoted link connections 10 permit the wheel frame 8 to rock, and at the same time move bodily with respect to the drill frame 9, which hereinafter will be referred to as the center or main drill supporting frame. This main drill supporting frame 9 is preferably rectangular and at the corners, thereof is formed with apertured lateral lugs 11 to which are pivoted, by means of pins 12, the spaced ears 13, 14 on the inner corners of the auxiliary drill supporting extension frames indicated generally at 15, 16.

The main drill supporting frame 9 is of less length than the wheel frame 8, but with the extensions 15, 16, pivoted thereto, the drill supporting frame formed of the three sections is of the same length as the wheel frame.

The wheel supporting frame 8 and the main drill frame 9 are rockable with respect to each other on a horizontal axis at right angles to the movement of the corn planter, on the pivoted link connections 10, while the auxiliary extension frames 15, 16 are rockable with respect to both of these frames 8 and 9, on a horizontal axis parallel to the path of movement on the pivot pins 12.

The intermediate portion of the frame 8 is supported on a pair of ground engaging wheels 17, 18 anchored to the opposite ends of the drive shaft 19, and the drive shaft is journaled in the lower ends of a pair of brackets 20, as at 21. The upper end of the pairs of transversely spaced brackets 20, are bolted to the under side of the frame 8 as at 22.

The ends of the frame 8 are mounted on a pair of ground engaging wheels 23, 24 and the mountings of these wheels are retractile so as to compensate for uneven ground over which the frame is to be drawn.

One of these retractile mountings is shown in Fig. 3 of the drawings, and it is believed that a description of one will clearly teach the construction of the other.

The mounting consists of a depending U-shaped bracket 25 formed with lateral flanges 26, 27, on the upper ends of the legs of the bracket, which are bolted as at 28 to the frame 8. It is to be understood that there are a pair of these brackets 25, for each wheel and one of these brackets is disposed at each side of each wheel.

In each bracket 25 there is movably mounted an apertured bearing block 29 the lower end of which bears on the bight portion 30 of the bracket under the tension of a coil spring 31, which is mounted between the legs of the bracket. The upper end of the coil spring bears against a cross bar 32 that is bolted between the legs of the bracket by the bolt 33.

Projecting from the ends of the hub 34 of each of the wheels 23, 24, are spindles 35, that are journaled in the apertures of the bearing blocks 29, which provide retractile mountings for each of the outer wheels 23, 24, of the frame 8.

The main drill frame 9 is raised or lowered bodily by a bell crank lever indicated generally at 36, the upstanding leg 37 of which forms the handle for rocking the lever.

The vertex of the bell crank lever 36 is rigidly coupled to a stub shaft 38 which is journaled to one side of an upstanding segmental plate 39 that is bolted to the wheel supporting frame 8 as at 40. The arcuate perimeter of the plate 39 is provided with a series of notches 41 that engage with the sliding detent 42 on the handle 37, whereby the bell crank lever is locked in any desired position.

The other leg 43 of the bell crank lever 36 projects forwardly and is joined to an eye bolt 44, anchored through the main frame 9 by a link 45. The handle 37 rises above the top of the wheeled supporting frame 8 and is disposed within reach of the driver seated upon the seat 46 which is supported above the frame 8.

Each of the auxiliary drill supporting frames 15, 16 is rockable by a pair of hand levers 47, 48 disposed within reach of the seat 46 on the main frame 8. The lower ends of the levers are connected to transverse operating rods 50, each of which is journaled in the main frame 8 on a pair of brackets 51, 52.

For each operating lever 47, 48, there is secured to the top of the frame 8 an upstanding arcuate plate 53, having notches 54 in its arcuate perimeter. Engageable with the notches 54 on the plate is a sliding detent 55 which is moved by the hand gripping arm 56 pivoted to the outer end of each handle.

To the outer end of each operating rod 50 there is rigidly coupled a bar 57 that projects forwardly from the rod and is joined to an eye bolt 58 that is anchored to the respective extension frames 15, 16.

The outer end of the arm 57 is joined to the eye bolt 58 by means of a link 59. Thus it will be seen that the movement of the operating handles 47, 48 will cause the rods 50 to move the arms 57 to rock the extensions 15, 16 on their pivots.

Supported adjacent the ends of the main drill frame 9, are the conventional seed cans 60, 61, the deposition of seed from which is governed in a conventional manner by a rotating shaft 62 that is operatively connected by a chain and sprocket mechanism 63 to the drive shaft 19.

Leading from the bottom of the seed cans 60, 61, are the drill boots 64 that deposit the seeds in the ground. The shaft 62 is formed with the extensions 65 which project beyond the cans 60, 61. There is a seed can 66 supported on the extension frame 15 and another seed can 67 supported on the extension frame 16 in alinement with the cans 60, 61.

Seed control deposit shafts 68, 69 lead inwardly from the cans 66, 67, and are universally coupled as indicated generally as at 70, to the extension 65.

The universal couplings, shown particularly in Fig. 6 of the drawings, each consist of a socket 72 formed with an apertured lug 73 on its inner end and is pivoted to a pin 74 on the end of the extension. The opening 75 of the socket 72 telescopically receives the inner end of the shaft 68 leading from the seed can 66 or 67.

Leading from the bottoms of the cans 66, 67, on the extensions 15, 16, are hollow necks 76, that conduct the seeds downwardly from the bottoms of the cans as the depositing mechanisms within the cans dispense the seeds.

The lower ends of the necks 76, are formed with diametrically spaced apertured lugs 77 pivoted to which as at 78, are the hollow stems 79 of the drill boots, indicated generally at 80. Thus it will be seen that the drill boots 80 for the cans 66, 67 on the extension frames 15, 16 are free to rock on a horizontal axis parallel to the path of movement of the planter.

It will be understood that there is one drill boot 80 for each of the end seed cans 66, 67, and furthermore, it is to be understood that the drill boots 64 leading from the intermediate seed cans 60, are rigid.

The forward end of each of the four drill boots 64, and 80 is pivoted to a bracket 81 these brackets projecting from the forward sides of the main drill frame 9, and the auxiliary frames 15, 16.

The drill boots 80 on the extensions 15, 16, are rockable simultaneously with the rocking of the extension frames so that the boots will always be in vertical alinement with the ground while the planter is being drawn thereover.

Referring particularly to Figs. 2 and 6 of the drawings, the means of rocking the boots 80 will be clear. From the respective extension frames 15, 16, there depend bar links 81' pivoted at their upper ends as at 82, to the brackets 83 anchored to the lower faces of the extension frames. Each link bar 81' is normally vertically disposed.

A diagonal link 84 is secured by the pivot 85 at its outer end to the rigid drill boot 64 and the inner end of this bar link 84 is pivoted to the lower end of the vertical link 81'.

Another diagonal link 86 is pivoted at its inner end as at 87 to the lower end of the vertical link 81' and at its outer end is pivoted as at 88 to the stem 79 of the boot 80. Thus it will be seen that when either of the extension frames 15, 16 is rocked, the boot 80, depending therefrom will rock on the pivot 78 by the action of the links 81', 84 and 86, so as to be in vertical position regardless of the angular disposition of the extension frame.

From the foregoing it will be seen that the operator on seat 46 can rock the central drill frame 9 by means of the lever 37 and that he can rock either one of the extension drill frames 15 and 16 through means of the levers 47 and 48. These frames 15 and 16 rock about horizontal axes which are parallel to the direction of travel of the machine so that their outer ends are raised and lowered by this rocking movement.

As before stated, the boots of the extension frames remain in a vertical position during the movement of said frames through the link connection 81', 84 and 86 and the pivoting of the lower portion of the boots to the parts 76 thereof as shown at 78 in Figures 6 and 7.

It is thought that the present embodiment of the invention has been disclosed in considerable detail merely for the purpose of exemplification, since in actual practice it attains the features of advantage enumerated as desirable in the statement of the invention and the above description.

It is to be understood that by describing in detail herein any particular form, structure, or arrangement, it is not intended to limit the invention beyond the terms of the claim, or the requirements of the prior art.

Having thus described my invention, what I claim as new is:—

A planter of the class described comprising an elongated wheeled frame, an elongated central drill frame hingedly connected to the wheeled frame, an extension frame hingedly connected to each end of the drill frame, manually operated means supported on the wheeled frame for raising and lowering the central drill frame, manually operated means on the wheeled frame for raising and lowering each of the extension frames, feeding means on said central frame and on each of the extension frames, each of said means including a drill boot, and means for holding the boots of the extension frames in a vertical position as such extension frames are being raised and lowered.

In testimony whereof I affix my signature.

MERRITT S. DRAPER.